United States Patent
Zhang et al.

(10) Patent No.: US 11,872,664 B2
(45) Date of Patent: Jan. 16, 2024

(54) TECHNOLOGICAL EQUIPMENT FOR TANK TRACK MOVING SUPPORTS

(71) Applicants: Qingdao University of Technology, Qingdao (CN); IK Gujral Punjab Technical University, Shubham Sharma, Jalandhar (IN); Qingdao Cabos Intelligent Manufacturing Co., Ltd, Qingdao (CN)

(72) Inventors: Yanbin Zhang, Qingdao (CN); Shuaiqiang Xu, Qingdao (CN); Shubham Sharma, Jalandhar (IN); Aiguo Qin, Qingdao (CN); Changhe Li, Qingdao (CN); Hanqi Fan, Qingdao (CN); Junting Li, Qingdao (CN); Tao Jiang, Qingdao (CN); Min Li, Qingdao (CN); Zongming Zhou, Qingdao (CN); Bo Liu, Deyang (CN); Yun Chen, Chengdu (CN); Yuying Yang, Qingdao (CN)

(73) Assignees: Qingdao University of Technology, Qingdao (CN); IK Gujral Punjab Technical University, Shubham Sharma, Jalandhar (IN); Qingdao Cabos Intelligent Manufacturing Co., Ltd, Qingdao (CN)

( * ) Notice: Subject to any disclaimer, the term of this patent is extended or adjusted under 35 U.S.C. 154(b) by 116 days.

(21) Appl. No.: 17/568,480

(22) Filed: Jan. 4, 2022

(65) Prior Publication Data
US 2023/0141649 A1    May 11, 2023

(30) Foreign Application Priority Data

Nov. 10, 2021 (CN) .......................... 202111326693.X

(51) Int. Cl.
*B23Q 1/00*    (2006.01)
*B23Q 3/18*    (2006.01)

(52) U.S. Cl.
CPC ............. *B23Q 1/0072* (2013.01); *B23Q 3/18* (2013.01)

(58) Field of Classification Search
CPC   B25B 11/02; B25B 5/006; B25B 5/04; B25B 5/14; B25B 5/163; B25B 5/166;
(Continued)

(56) References Cited

U.S. PATENT DOCUMENTS

| | | | | |
|---|---|---|---|---|
| 4,951,932 A | * | 8/1990 | Thomas | .................. B25B 5/163 269/212 |
| 5,026,033 A | * | 6/1991 | Roxy | ..................... B23Q 3/103 269/45 |

(Continued)

*Primary Examiner* — Lee D Wilson
*Assistant Examiner* — Robert F Neibaur
(74) *Attorney, Agent, or Firm* — True Shepherd LLC; Andrew C. Cheng

(57) ABSTRACT

A technological equipment for tank track moving supports is provided and includes a zero-point positioning system, a workpiece identifying system and a clamping apparatus in cooperation with the moving support, the clamping apparatus includes a tooling plate, a clamp and a pressing device for pressing the moving support are detachably connected to the tooling plate, the moving support is located between the clamp and the pressing device, and the pressing device abuts against the moving support. The moving support with different shapes and sizes can be clamped, and the clamping is stable and convenient to operate.

4 Claims, 10 Drawing Sheets

(58) Field of Classification Search
CPC ......... B25B 5/061–5/065; B25B 5/087; B25B 1/02; B25B 1/08; B25B 1/2405; B25B 1/2457; B25B 1/2463; B25B 1/2473; B25B 1/2484; B25B 1/18; B23Q 3/18; B23Q 3/10; B23Q 3/102; B23Q 3/103; B23Q 3/06; B23Q 3/062; B23Q 1/0072; B23Q 1/0063; B23Q 1/0081
USPC ...................................... 269/43, 91, 283, 309
See application file for complete search history.

(56) References Cited

U.S. PATENT DOCUMENTS

| | | | | |
|---|---|---|---|---|
| 5,305,992 | A * | 4/1994 | Kish ...................... | B23Q 1/035 |
| | | | | 269/274 |
| 5,437,440 | A * | 8/1995 | Keaton ................... | B25B 5/062 |
| | | | | 269/24 |
| 5,477,598 | A * | 12/1995 | Borner, Jr. ............ | B25B 27/304 |
| | | | | 29/227 |
| 8,814,154 | B2 * | 8/2014 | Woods ...................... | B25B 5/12 |
| | | | | 269/238 |
| 9,308,610 | B2 * | 4/2016 | Canuto .................. | B23Q 3/105 |
| 10,507,878 | B2 * | 12/2019 | Lee .......................... | B23Q 1/64 |
| 10,556,326 | B1 * | 2/2020 | Kelly ........................ | B25B 5/02 |
| 10,603,750 | B1 * | 3/2020 | Taylor .................. | B23Q 1/0072 |
| 10,661,449 | B2 * | 5/2020 | Zachary ................. | B23B 31/30 |
| 10,751,854 | B2 * | 8/2020 | Zanni ...................... | B25B 5/062 |
| 11,090,775 | B2 * | 8/2021 | Chou .................. | B23Q 1/0072 |
| 11,358,256 | B2 * | 6/2022 | Giles ........................ | B23Q 3/06 |
| 11,554,453 | B2 * | 1/2023 | Lang .................... | B23Q 1/0072 |
| 11,691,294 | B2 * | 7/2023 | Norton ................. | B25J 15/0019 |
| | | | | 483/1 |
| 2019/0224794 | A1 * | 7/2019 | Luthi ..................... | B23Q 3/082 |

* cited by examiner

TECHNOLOGICAL EQUIPMENT FOR TANK TRACK MOVING SUPPORTS

TECHNICAL FIELD

The invention relates to the technical field of moving support processing, and in particular to a technological equipment for tank track moving supports.

BACKGROUND

Mechanization is increasingly widely applied in the production of various industries in China, track-type structures that can adapt to complex working environment and overcome harsh working conditions have been widely used in all kinds of mechanical equipment, for example tanks, construction machinery and agricultural machinery, etc. Due to the different application ways of different machines, there are many kinds and sizes of tracks. The moving support is an important component of the tank track drive device, so it has a wide variety, changeable structure and different sizes, which makes diversified production of the manufacturing cell impossible, resulting manual cooperation with machine tools, difficult clamping and positioning, low utilization rate of fixtures, numerous processes and low efficiency. Therefore, it is very necessary to develop a technological equipment which can greatly improve the production efficiency and product quality of tank track moving supports and reduce production costs.

In the prior art, Chinese patent application No. CN201721902401.1 (corresponding to Chinese patent publication No. CN210452406U) discloses a workpiece fixture, which includes a rotating disc, a chassis, a fixed block, a fixed clamping plate, a movable clamping plate, a telescopic handle and a spring. The chassis is arranged above the rotating disc, and the fixed block, the fixed clamping plate and the movable clamping plate are arranged above the chassis at the left and right sides. Telescopic handles are installed to clamp the workpiece by the fixed clamping plate and the movable clamping plate, and springs on the movable clamping plate can buffer and reset. By operating the telescopic handle to drive the movement of the movable clamping plate, the workpiece can be clamped. The device satisfies the function of clamping the workpiece, and requires manual work. However, the device cannot meet the requirements of automation without manual work, and the clamping edge requires high flatness of the workpiece, and its general performance is poor. Chinese patent application No. CN202020088099.6 (corresponding to Chinese patent publication No. CN211415077U) discloses a workpiece fixture, which includes a box body and a partition board. The inner side wall of the box body is fixedly connected with a partition board, and one side of the box body positioned above the partition board is provided with a disc-type collecting device and the partition board located at one side of the disc-type collecting device is provided with a sleeve-type collecting device; a raw material placement box is arranged in that box body between the disc type part collect device and the sleeve-type collecting device; handles are symmetrically arranged on the outer side wall of the box body, and a hook is fixedly connected on one side wall of the box body. The device cooperates with the vertical machining center for machining, and can clamp and protect the workpiece to be free from damage. However, the positioning of the device is over-positioning, which cannot guarantee the accurate positioning of the workpiece; meanwhile, the box-type design also leads to the high cost of fixture. Chinese patent application No. CN201620540555.X (corresponding to Chinese patent publication No. CN205660411U) discloses a workpiece fixture, which includes a cylinder, two groups of connecting rod structures and clamps, the clamps include a support body and two clamping jaws. The cylinder is installed at the top of the clamps and connected with the clamps through connecting rod structures. When the cylinder starts to work, the piston rod of the cylinder pushes the connecting rods, so that the short rod pushes the long rod to both sides, and the long rod makes lever movement with the middle hinge point as the axis to drive the clamping jaws to reciprocate in the dovetail groove. The telescopic cylinder drives the connecting rod structures, and further drives the clamping jaws to carry out clamping. The device can realize automatic clamping of the workpiece, with small size and reliable clamping. However, the device has no adaptability to workpieces, and can only process workpieces with specific thickness and shape, and cannot realize flexible processing.

To sum up, the process equipment of tank track moving supports is less, and the existing clamping apparatus still has many shortcomings in application, which cannot meet the requirements of automatic and flexible production of tank track moving supports. As for the workpiece of tank track moving supports, due to the variety of workpieces and the complex geometric structure of the workpiece, it is easy to make the fixture universality poor and the positioning error large, and it is easy for the workpiece to be deformed due to unreliable clamping or excessive clamping force. Under the background of the continuous development of mechanization, it is necessary to have a set of technological equipment to meet the production of tank track moving support. Therefore, it is an urgent to design technological equipment for tank track moving support.

SUMMARY

An objective of the invention is to provide technological equipment for tank track moving support to solve the above-mentioned problems in the prior art.

In order to achieve the above objective, the invention provides the following scheme: the invention provides a technological equipment for a tank track moving support, which includes a zero-point positioning system, a workpiece identifying system and a clamping apparatus in cooperation with the moving support, the clamping apparatus includes a tooling plate, a clamp and a pressing device for pressing the moving support are detachably connected to the tooling plate, the moving support is located between the clamp and the pressing device, and the pressing device abuts against the moving support.

Preferably, when the side of the moving support opposite to the surface to be processed is uneven, the clamp includes a supporting block, which is provided with a special-shaped groove, and the special-shaped groove includes two trapezoidal grooves which are communicated with each other and have different sizes; the moving support is located in the special-shaped groove and abuts against the trapezoidal groove with a smaller size; the pressing device includes a pressing arm and a pressing part, the pressing arm is fixedly connected with the supporting block, and the pressing part is arranged on the pressing arm and abuts against the moving support.

Preferably, the side wall to be processed of the moving support abuts against the side wall of the supporting block.

Preferably, the pressing part includes a first pressing part, a second pressing part and a square column, one end of the pressing arm facing away from the supporting block is provided with two pressing protrusions arranged in parallel up and down as an upper pressing protrusion and a lower pressing protrusion respectively, the upper pressing protrusion is screwed with a pressing bolt, the square column slides through the lower pressing protrusion, both two ends of the square column are fixedly connected with the first pressing part and the second pressing part respectively, the second pressing part is located between the two pressing protrusions, a return spring is fixedly connected between the second pressing part and the lower pressing protrusion, the return spring is sleeved outside the square column, and the first pressing part abuts against the moving support.

Preferably, when the surface to be processed of the moving support is uneven, one side of the end face of the moving support is fixedly provided with a convex inclined plane, the other side of the end face of the moving support is provided with a concave inclined plane, the convex inclined plane is correspondingly provided with the concave inclined plane and the inclination angle of the convex inclined plane is opposite to that of the concave inclined plane; the clamp specifically includes a plurality of first positioning blocks, and the moving support is positioned above the first positioning blocks; the bottoms of the first positioning blocks are detachably connected with the tooling plate, and each of the first positioning blocks is screwed with a first positioning pin, which abuts against the moving support; the pressing device includes a third pressing part and a fourth pressing part, which are located at both two sides of the moving support respectively.

Preferably, the third pressing part includes a first cylinder and a first pressing plate, wherein the extension rod (also referred to as piston rod) of the first cylinder is fixedly connected with the first pressing plate, and the first pressing plate abuts against the convex inclined plane of the moving support.

Preferably, the fourth pressing part includes a first base, which is detachably connected with the tooling plate; one end of the first base close to the third pressing part is fixedly connected with a second cylinder; the extension rod of the second cylinder is fixedly connected with a sliding chuck; the sliding chuck is hinged with a first connecting rod; the first connecting rod is fixedly connected with a second pressing plate; the second pressing plate abuts against the concave inclined plane.

Preferably, when the moving support includes a square structure which is convenient for clamping and needs batch processing, the moving support includes a square clamping part and an object to be processed, and a number of the pressing device is multiple, each pressing device is arranged between corresponding two moving supports, and the pressing device abut against the corresponding two moving supports, a number of the clamp is multiple, and the clamp is specifically located below corresponding two moving supports.

Preferably, the clamp includes a second base, which is fixedly connected with the tooling plate; mounting plates are symmetrically embedded on both two sides of the top surface of the second base; the mounting plates are fixedly connected with second positioning blocks respectively; the second positioning blocks are arranged in contact with the clamping part; ends of the second positioning blocks away from the center of the second base are fixedly provided with limiting protrusions; the limiting protrusions are screwed with second positioning pins respectively, which are connected with the sides of the clamping parts.

Preferably, the pressing device includes a third cylinder fixedly arranged in the middle of the second base, and the extension rod of the third cylinder is fixedly connected with a connecting part, the connecting part is hinged with two second connecting rods which are symmetrically arranged; the second connecting rods are hinged with two sliders which are slidably connected with guide rails, the guide rails are fixedly connected with the second base, and the two sliders respectively abut against two clamping parts located on the same second base.

The invention discloses the following technical effects: the clamps are detachably installed on the tooling plate, so that workers may conveniently adjust the shape of the clamping apparatus in time with the change of the shape of the moving support, and the problem of the singular production of the manufacturing cell of the tank track moving support is solved; the clamps of the invention can limit the moving support together with the pressing device, clamp moving supports of different sizes, and are convenient for processing the moving support; the invention has the advantages of easy operation, good clamping effects on workpieces and high reliability, and can be applied to the clamping multi-shape and multi-size moving support, which provides a basis for subsequent parts processing and improves the working efficiency of subsequent work.

BRIEF DESCRIPTION OF THE DRAWINGS

In order to more clearly explain the embodiments of the invention or the technical solutions in the prior art, the drawings needed in the embodiments will be briefly introduced below. Apparently, the drawings in the following description are only some embodiments of the invention, and for ordinary technicians in the field, other drawings can be obtained according to these drawings without making creative efforts.

in drawings: 1—machining center, 2—workbench, 3—moving support, 4—tooling plate, 5—supporting block, 6—third pressing part, 7—special—shaped groove, 8—pressing arm, 10—first pressing part, 11—second pressing part, 12—square column, 13—pressing protrusion, 14—pressing bolt, 15—return spring, 16—convex inclined plane, 17—concave inclined plane, 18—first positioning block, 19—first positioning pin, 20—first cylinder, 21—first pressing plate, 22—first base, 23—second cylinder, 24—sliding chuck, 25—first connecting rod, 26—second pressing plate, 27—clamping part, 28—mounting plate, 29—second positioning block, 30—limiting protrusion, 31—second positioning pin, 32—third cylinder, 33—connecting part, 34—slider, 35—guide rail, 36—fourth pressing part, 37—second base, 38—second connecting rod.

DETAILED DESCRIPTION OF THE EMBODIMENTS

Next the technical schemes in the embodiments of the invention will be clearly and completely described with reference to the drawings in the embodiments of the invention. Obviously, the described embodiments are only part of the embodiments of the invention, not all of them. Based on the embodiments in the invention, all other embodiments obtained by ordinary technicians in the field without creative work are within the scope of the invention.

In order to make the above-mentioned objects, features and advantages of the invention more obvious and easier to understand, the invention will be described in further detail below with reference to the drawings and detailed description.

Embodiment 1

Figure 1:
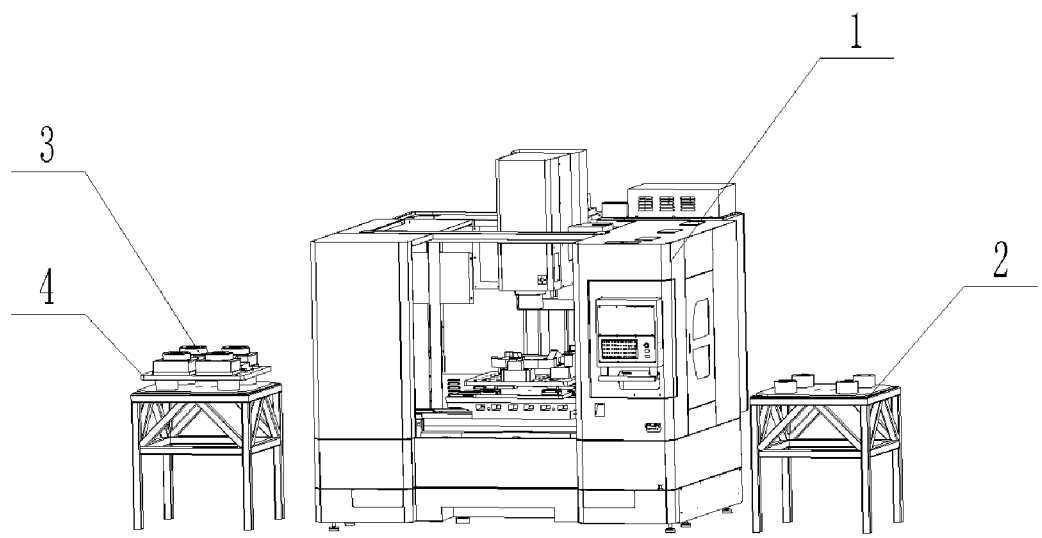
FIG. 1 is a schematic diagram of the processing machine tool of the invention.
Figure 2:
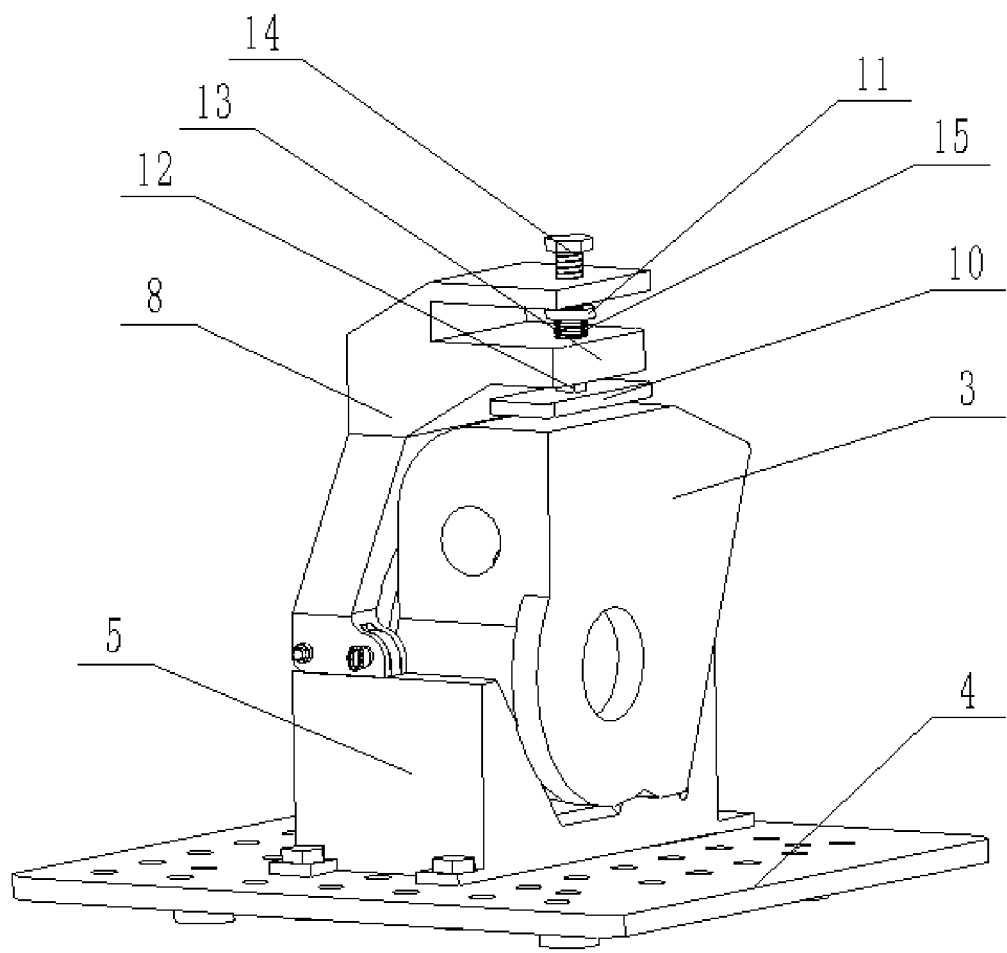
FIG. 2 is a three-dimensional view of the clamping apparatus of the invention.
Figure 3:
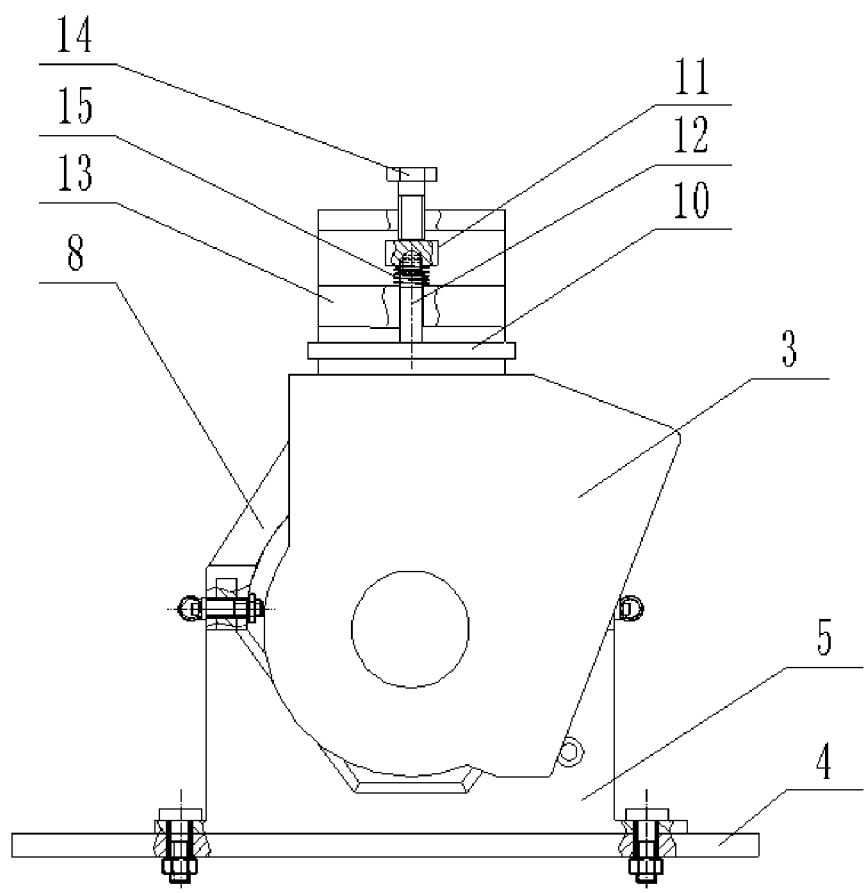
FIG. 3 is a structural schematic diagram of the clamping apparatus of the invention.
Figure 4:
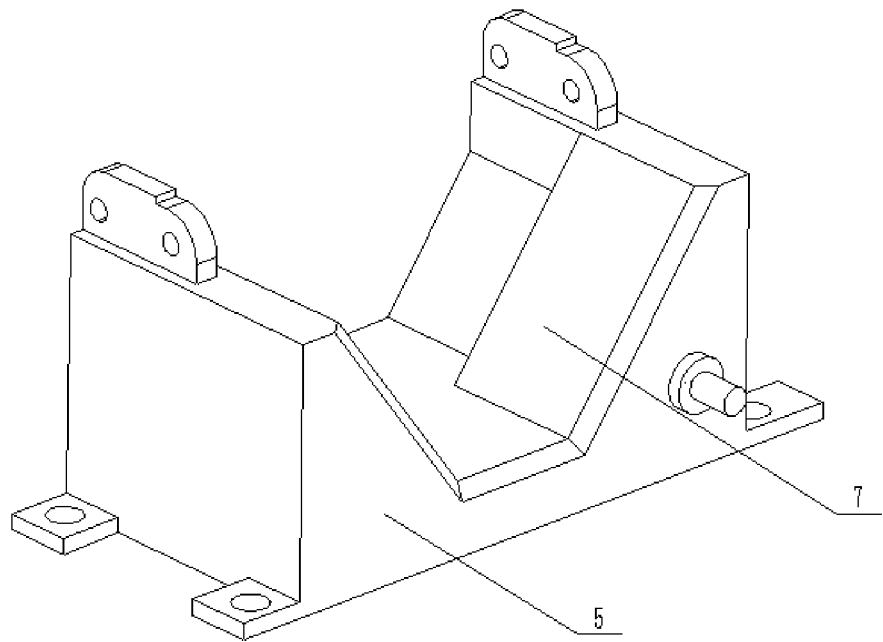
FIG. 4 is a three-dimensional view of the clamp of the invention.
Figure 5:
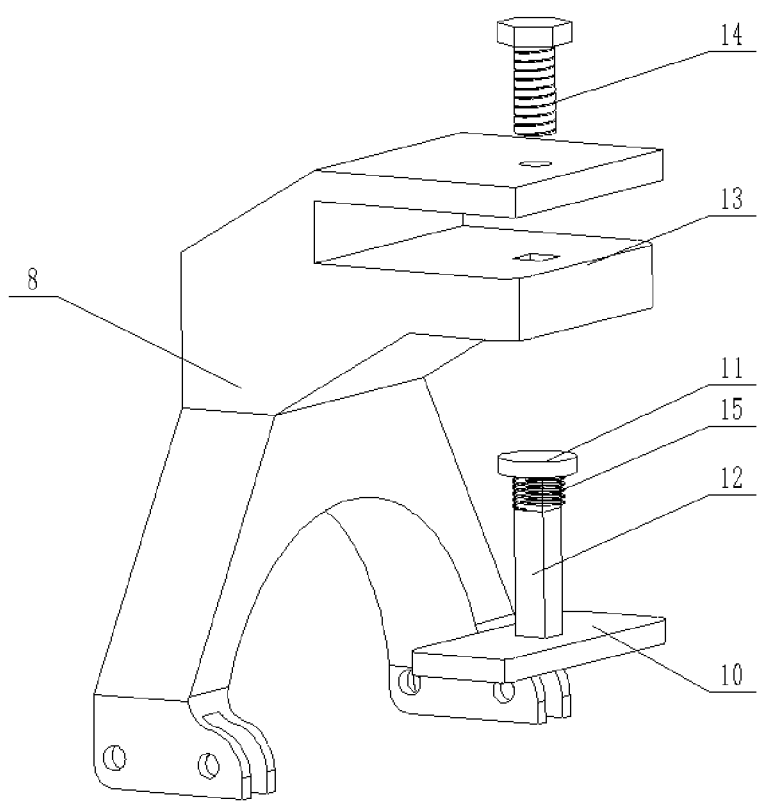
FIG. 5 is an exploded view of the pressing device of the invention.
Figure 6:
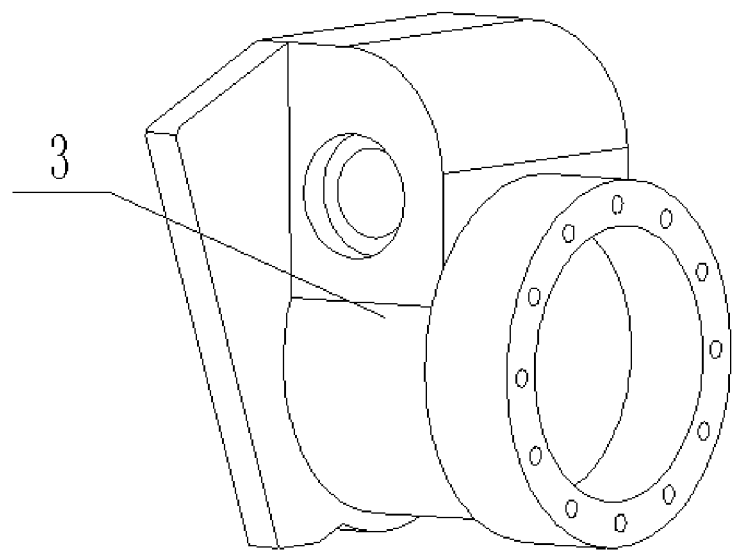
FIG. 6 is a three-dimensional view of the moving support of the invention.
Figure 19:
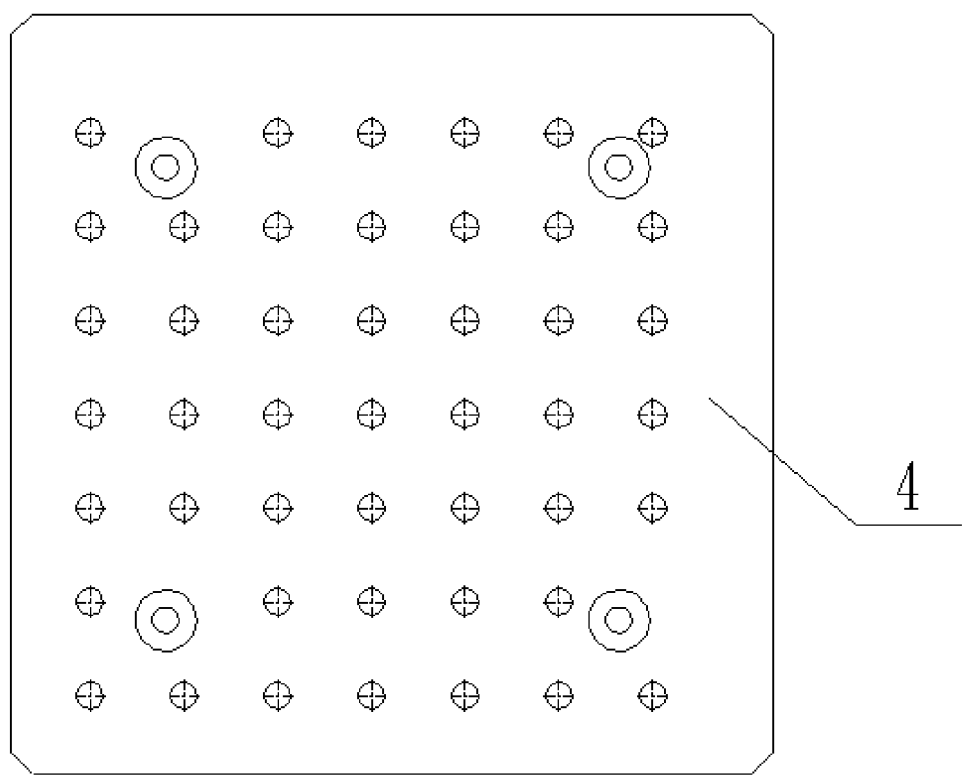
FIG. 19 is a structural schematic diagram of the tooling plate in Embodiment 3 of the invention.

As shown in FIG. 1-FIG. 6 and FIG. 19, the technological equipment for tank track moving support proposed in this invention includes the zero-point positioning system, the workpiece identifying system and the clamping apparatus cooperating with the moving support 3, the clamping apparatus includes the tooling plate 4, the clamp and the pressing device for pressing the moving support 3 are detachably connected to the tooling plate 4, and the moving support 3 is situated between the clamp and the pressing device, and the pressing device abuts against the moving support 3.

A set of manufacturing cell consists of two machining centers 1, each of which is equipped with two workbenches 2 respectively. The workbenches 2 assists the manipulator to replace the moving support 3 in the machining centers 1. Machining centers 1 are equipped with zero-point positioning system and workpiece identifying system. The zero-point positioning system completes zero-point positioning through DLDDW-138 zero-point positioning module. The application of the zero-point positioning system is beneficial to the industrial camera to lock the identifying area and facilitates the machine tool processing and programming. The workpiece identifying system refers to a common identifying system in the prior art. The tooling plate 4 is the key to linking the moving support 3 with the machining centers 1. After the workpiece is processed, the tooling plate 4 can be detached from the follow fixture and reused in other fixtures.

In a further optimization scheme, when the side surface of the moving support 3 opposite to the surface to be processed of the moving support is uneven, the surface to be processed of the moving support 3 is flat, and the side surface opposite to the surface to be processed is fixedly provided with a cylindrical protrusion, so clamping can be only achieved on the side surface. At this time, the clamp specifically includes the supporting block 5, which is provided with the special-shaped groove 7, and the special-shaped groove 7 includes two trapezoidal grooves which are communicated with each other and have different sizes; the moving support 3 is located in the special-shaped groove 7 and abuts against the trapezoidal groove with the smaller size, while the cylindrical protrusion on the moving support 3 is in the trapezoidal groove with the larger size; the pressing device includes the pressing arm 8 and the pressing part, the pressing arm 8 is fixedly connected with the clamp and the pressing part is arranged on the pressing arm 8 and abuts against the moving support 3; the moving support 3 is limited by the special-shaped groove 7, the third positioning pin is fixedly connected to the supporting block 5, and the moving support 3 is positioned by the third positioning pin, so it is easy to press the moving support 3 tight by the pressing device. When positioning the workpiece is carried out, the moving support 3 is placed on the special-shaped groove 7 of the clamps. According to the six-point positioning principle, the special-shaped groove 7 restrains the moving support 3 from moving in the Z-axis direction, the movement in the X-axis direction, the rotation around the X-axis direction and the rotation around the Z-axis direction. The third positioning pin is in contact with the moving support 3 to restrict the rotation and movement of the moving support 3 around the Y-axis direction; the moving support 3 is clamped in the machining center 1, and then the surface to be processed of the moving support 3 are subject to machining processes, such as milling, contour milling, annular milling, boring, drilling, tapping and thread milling.

In a further optimization scheme, the four corners of the supporting block 5 are provided with threaded holes, which are fixedly connected with the tooling plate 4 through bolts. Adding threaded holes is carried out at the sideline position of the supporting block 5 depending on the size of the supporting block 5, to ensure the fixed strength between the supporting block 5 and the tooling plate 4.

In a further optimization scheme, the side wall to be processed of the moving support 3 abuts against the side wall of the supporting block 5. The size of the side wall to be processed is larger than that of the supporting block 3, so that when the moving support 3 is in the special-shaped groove 7, the side wall to be processed is out of the special-shaped groove 7. Since the side wall to be processed abuts against the side wall of the supporting block 5, the moving support 3 will not slide inward along the special-shaped groove 7 during processing the surface to be processed, so that the moving support 3 can be processed normally.

In a further optimization scheme, the pressing part includes the first pressing part 10, the second pressing part 11 and the square column 12, one end of the pressing arm 8 facing away from the supporting block 5 is provided with two pressing protrusions 13 arranged in parallel up and down as an upper pressing protrusion and a lower pressing protrusion respectively, the upper pressing protrusion 13 is screwed with pressing bolts 14, the square column 12 slides through the lower pressing protrusion 13, both ends of the square column 12 are fixedly connected with the first pressing part 10 and the second pressing part 11 respectively, and the second pressing part 11 is located between the two pressing protrusions 13; the first pressing part 10 adopts a plate-like structure, the square column 12 applies pressure to the moving support 3 through the first pressing part 10, the second pressing part 12 has a cylindrical structure, and the pressing bolt 14 applies pressure to the second pressing part 12, so that the first pressing part 10 applies pressure to the moving support 3; the return spring 15 is fixedly connected between the second pressing part 11 and the lower pressing protrusion 13, the return spring 15 is sleeved outside the square column 12, and the first pressing part 10 abuts against the moving support 3. The square column 12 can prevent the first pressing part 10 from rattling and scratching the workpiece. When the pressing part presses down the moving bracket 3, the pressing bolt 14 is tightened, and the threaded structure makes the moving support go down, thereby driving the first pressing part 10 and the second pressing part 11 to press down. Therefore, the bottom of the first pressing part 10 contacts with the moving support 3 and moving support 3 is pressed tight. After the machining is finished, the pressing bolt 14 is loosened and moved upwards, and the first pressing part 10 and the second pressing part 11 are reset under the action of the return spring 15, so that the moving support 3 is free from clamping, and the machined moving support 3 is taken out.

Embodiment 2

Figure 7:
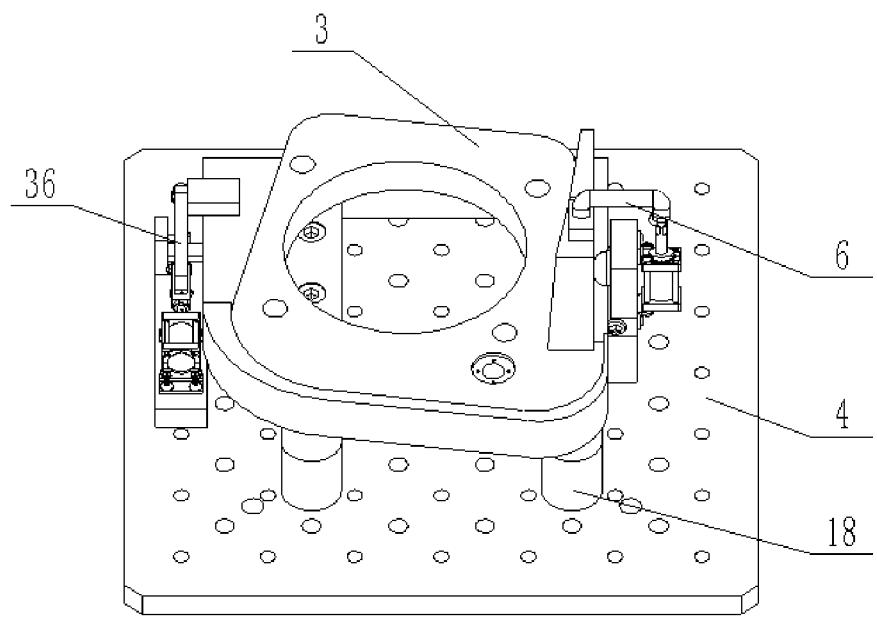
FIG. 7 is a three-dimensional view of the clamping apparatus in Embodiment 2 of the invention.
Figure 8:
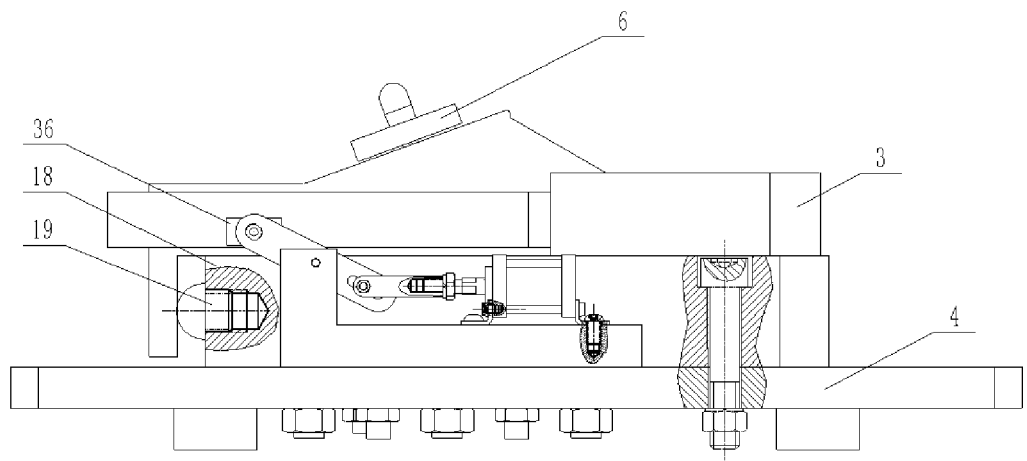
FIG. 8 is a structural schematic diagram of the clamping apparatus in Embodiment 2 of the invention.
Figure 9:
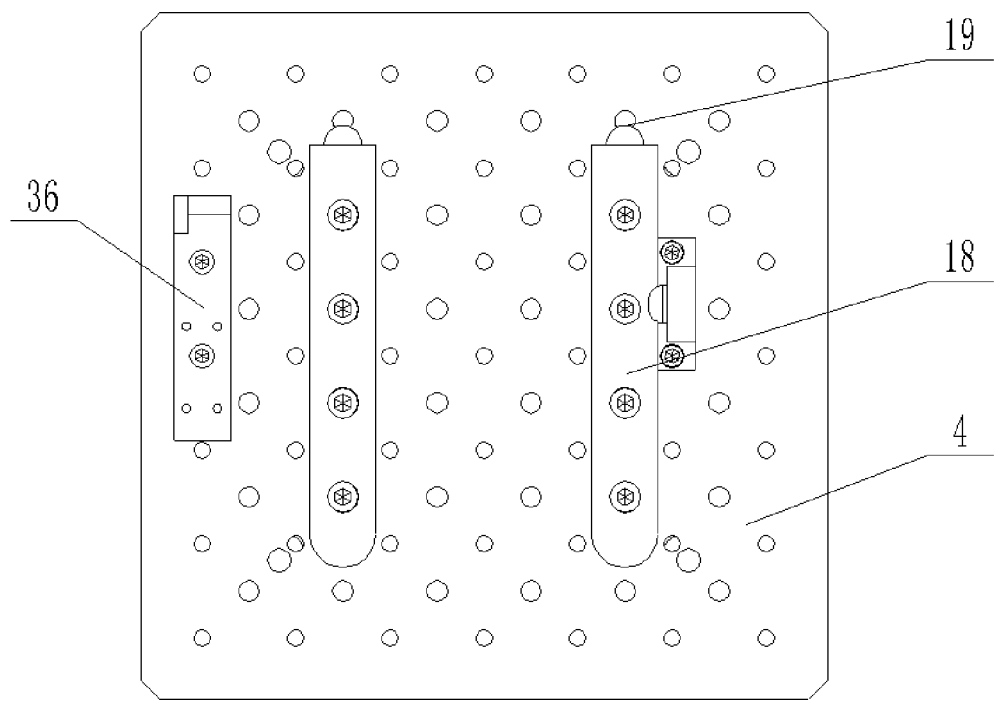
FIG. 9 is a top view of the tooling plate installation in Embodiment 2 of the invention.
Figure 10:
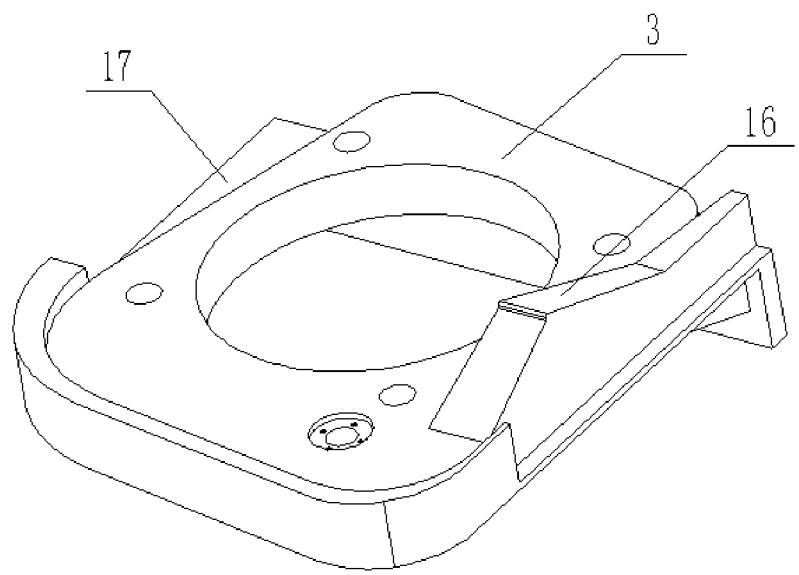
FIG. 10 is a three-dimensional view of the moving support in Embodiment 2 of the invention.
Figure 11:
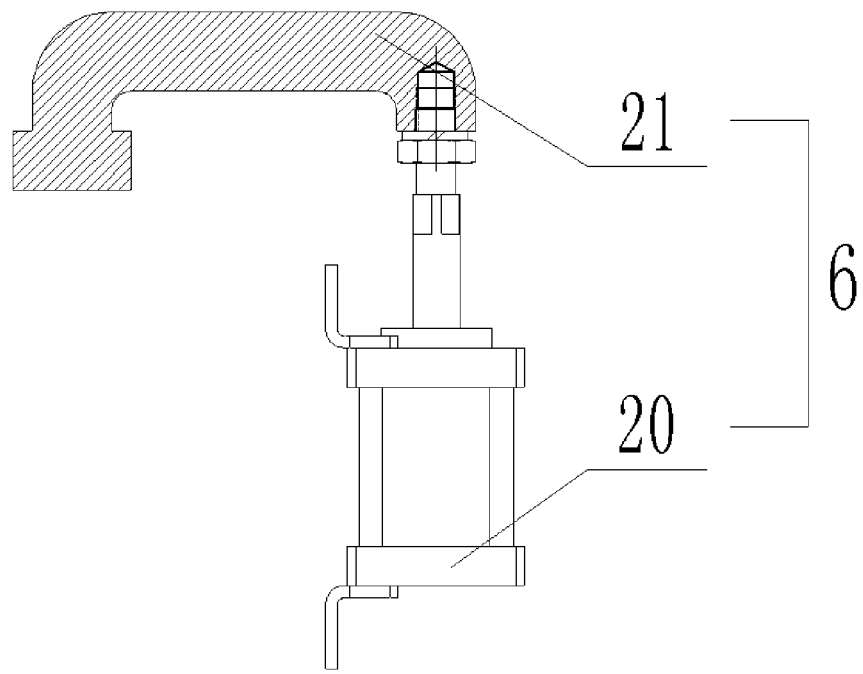
FIG. 11 is a structural diagram of the first pressing part in Embodiment 2 of the invention.
Figure 12:
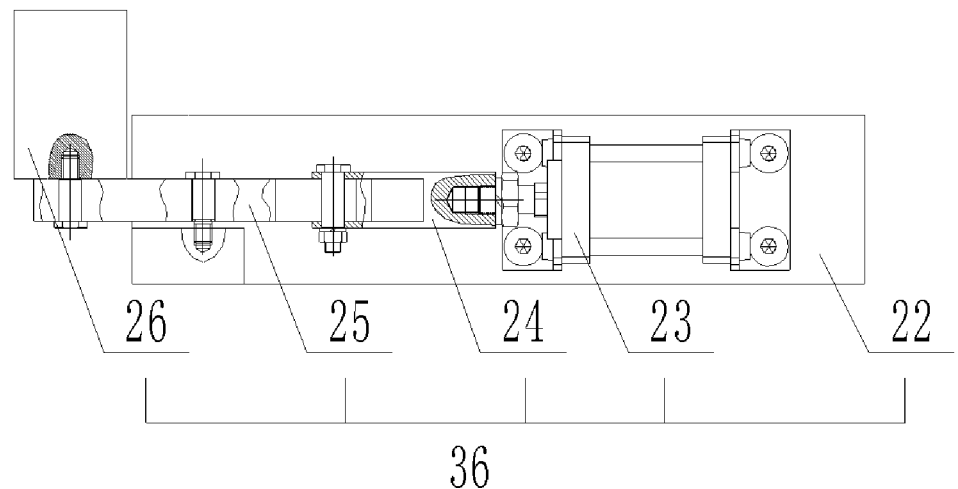
FIG. 12 is a structural diagram of the second pressing part in Embodiment 2 of the invention.
Figure 13:
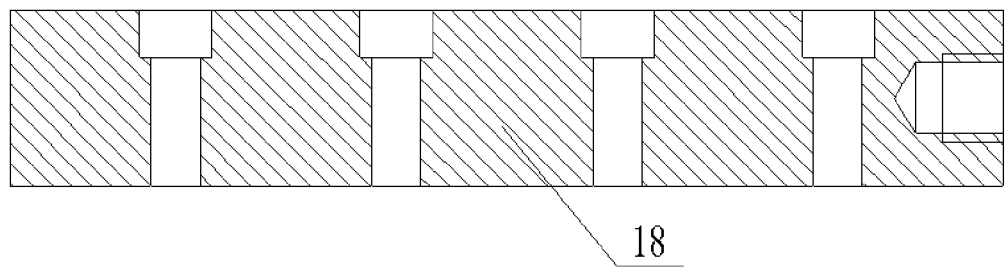
FIG. 13 is a structural diagram of the positioning block in Embodiment 2 of the invention.

Referring to FIG. 7-FIG. 13, this embodiment proposes the technological equipment for tank track moving supports. The only difference between this embodiment and the embodiment 1 is that when the surface to be processed of the moving support 3 is uneven, one side of the end face of the moving support 3 is fixedly provided with the convex inclined plane 16, the other side of the end face of the moving support 3 is provided with the concave inclined plane 17, the convex inclined plane 16 is correspondingly provided with the concave inclined plane 17 and the inclination angle of the convex inclined plane 16 is opposite to that of the concave inclined plane 17; the clamp includes a plurality of first positioning blocks 18, and the moving support 3 is positioned above the first positioning blocks 18; the bottom of the first positioning blocks 18 is detachably connected with the tooling plate 14, and the first positioning block 18 is screwed with the first positioning/supporting pin 19; the first positioning pin 19 abuts against the moving support 3, and the pressing device includes the third pressing part 6 and the fourth pressing part 36, the third pressing part 6 and the fourth pressing part 36 are located at both sides of the moving support 3. The first positioning block 18 adopts a strip-shaped flat plate structure, the first positioning block 18 is provided with countersunk holes in the axial direction, the first positioning block 18 is fixedly connected with the tooling plate 4 through the countersunk holes, the end of the first positioning block 18 is provided with a threaded hole, the first positioning block 18 is fixedly connected with the first positioning pin 19 through the threaded hole and the first positioning pin 19 contacts with the moving support 3 to position the moving support 3.

In a further optimization scheme, the third pressing part 6 includes the first cylinder 20 and the first pressing plate 21, the extension rod of the first cylinder 20 is fixedly connected with the first pressing plate 21, and the first pressing plate 21 abuts against the convex inclined plane 16 of the moving support 3. The total pressure acting by the third pressing part 6 on the moving support 3 is $F_1$, and the included angle in other numerical directions is $\alpha$, and then the positive pressure $F_\alpha$ of the third pressing part 6 on the moving support 3 is $F_\alpha = F_1 \cos \alpha$.

In a further optimization scheme, the fourth pressing part 36 includes the first base 22, which is detachably connected with the tooling plate 4, one end of the first base 22 close to the third pressing part 6 is fixedly connected with the second cylinder 23, the extension rod of the second cylinder 23 is fixedly connected with the sliding chuck 24, the sliding chuck 24 is hinged with the first connecting rod 25, the first connecting rod 25 is fixedly connected with the second pressing plate 26, the second pressing plate 26 abuts against the concave inclined plane 17. The output thrust of the second cylinder 23 is $F_2$, when pressing, the included angle between the first connecting rod 25 and the vertical direction is $\theta$, and then the vertical component is $F_2 \cot \theta$. According to the lever principle, taking the equidistant sides of the first connecting rod 25 as an example, then the pressing force of the fourth pressing part 36 on the moving support 3 is $F_\theta$, wherein $F_\theta = F_2 \cot \theta$, therefore the pressing force of the pressing device on the moving support 3 is $F_N = F_1 \cos \alpha + F_2 \cot \theta$.

In the process of pressing, the first cylinder 20 drives the first pressing plate 21 to move directly, the first pressing plate 21 contacts with the convex inclined plane 16 and exerts clamping force to tighten one side of the moving support 3, and the second cylinder 23 drives the sliding chuck 24 to make the first connecting rod 25 rotate, driving the second pressing plate 26 to press the concave inclined plane 17 and exert clamping force to tighten the other side of the moving support 3. In this case, the first pressing plate 21 and the second pressing plate 26 work together to not only limit the horizontal movement of the moving support 3, but also press the moving support 3 against the clamps, so that the clamping reliability is high.

Embodiment 3

Figure 14:
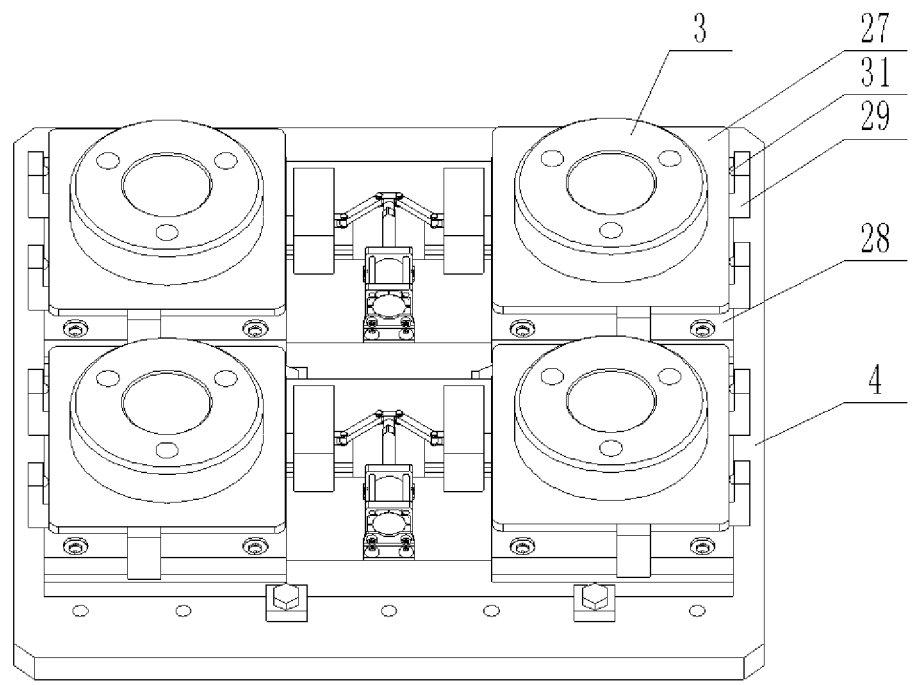
FIG. 14 is a three-dimensional view of the clamping apparatus in Embodiment 3 of the invention.
Figure 15:
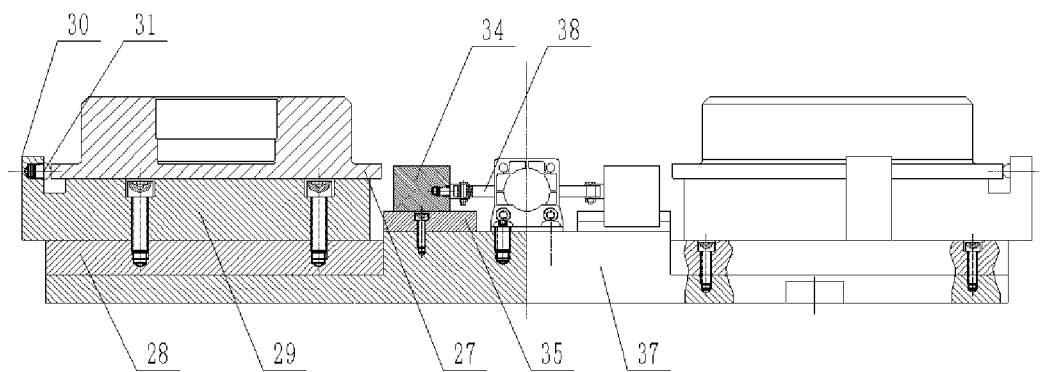
FIG. 15 is a structural schematic diagram of the clamping apparatus in Embodiment 3 of the invention.
Figure 16:
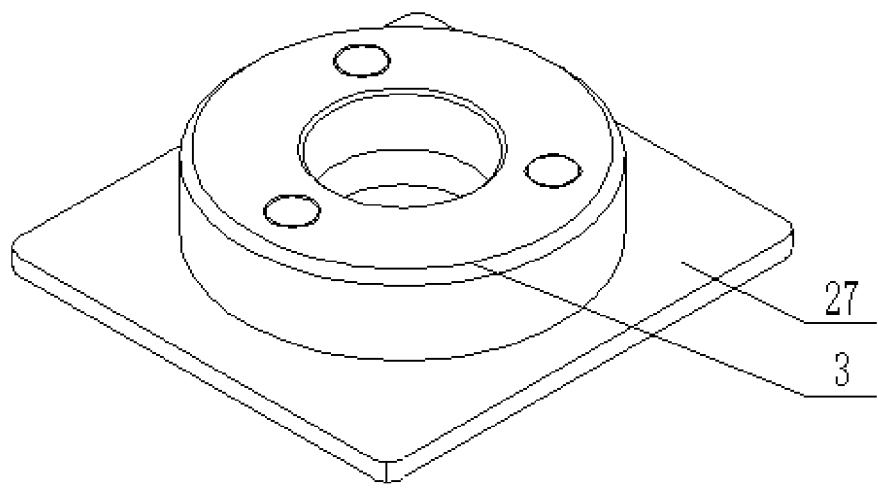
FIG. 16 is a structural schematic diagram of the moving support in Embodiment 3 of the invention.
Figure 17:
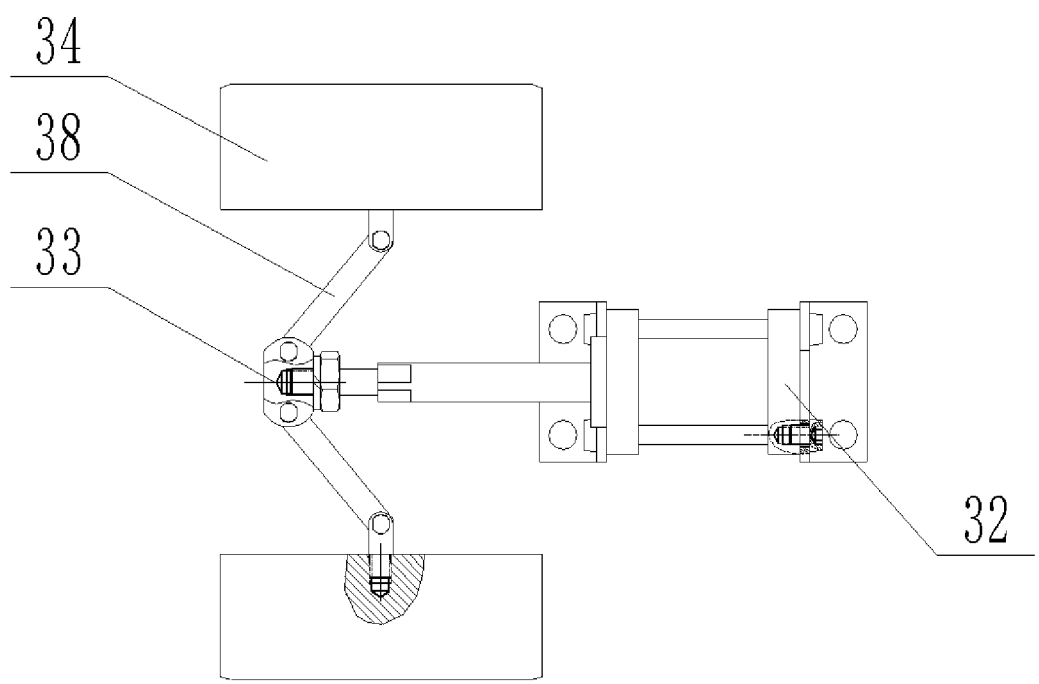
FIG. 17 is a structural schematic diagram of the pressing device in Embodiment 3 of the invention.
Figure 18:
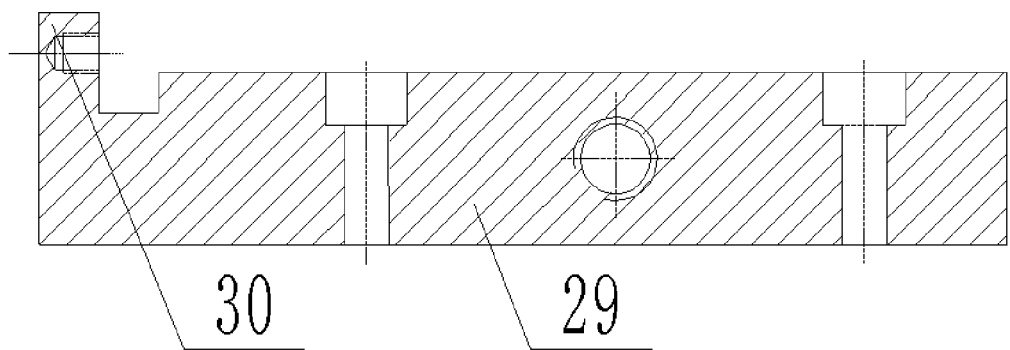
FIG. 18 is a structural schematic diagram of the second positioning block in Embodiment 3 of the invention.

Referring to FIG. 14-FIG. 18, this embodiment provides the technological equipment for tank track moving supports. The only difference between this embodiment and the embodiment 1 is that when the moving support 3 includes the square structure which is convenient for clamping, the moving support 3 includes the square clamping part 27 and an object to be processed, each pressing device is arranged between two moving supports 3 and abuts against the two moving supports 3, and each clamp is located below the two moving supports 3. When mass production is required, multiple groups of pressing devices can be installed in parallel on the tooling plate 4, and multiple moving supports 3 can be clamped and processed together, which shortens the time for changing tooling and improves the working efficiency.

In a further optimization scheme, the clamp includes the second base 37, which is fixedly connected with the tooling plate 4, mounting plates 28 are symmetrically embedded on both sides of the top surface of the second base 37, the mounting plates 28 are fixedly connected with second positioning blocks 29, the second positioning blocks 29 are arranged in contact with the clamping parts 27, one end of the second positioning block 29 away from the center of the second base 37 is fixedly provided with the limiting protrusion 30, and the limiting protrusion 30 is screwed with the second positioning/supporting pin 31, which is connected with the side of the clamping part 27. The second positioning block 29 and the second positioning pin 31 on the second positioning block 29 simultaneously tighten the two groups of workpieces, and the moving support 3 is clamped several times to realize the processing procedures, such as face milling, contour milling, drilling, tapping and thread milling. During the clamping process, the thickness of the mounting plate 28 can be adjusted to adjust the relative height between the moving support 3 and the slider 34, and the clamping part 27 of the moving support 3 can be pressed by the pressing device.

In a further optimization, the pressing device includes the third cylinder 32 fixedly arranged in the middle of the second base 37, and the extension rod of the third cylinder 32 is fixedly connected with the connecting part 33, the connecting part 33 is hinged with two second connecting rods 38 which are symmetrically arranged, the second connecting rods 38 are hinged with sliders 34 which are slidably connected with the guide rails 35, the guide rails 35 are fixedly connected with the second base 37, and the two sliders 34 respectively abut against two clamping parts 27 located on the same second base 37. In the process of pressing, the cylinder drives the connecting part 33 to move. Under the action of the second connecting rods 38, the sliders 34 on both sides move horizontally along the guide rails 35, clamping the moving supports 3 on both sides simultaneously. When the pressing device presses the moving supports 3, the included angle between the second connecting rod 38 and the vertical direction is β, and the reaction force of the second connecting rods 38 on both sides forms a mechanical balance with the thrust $F_3$ of the cylinder extension rod, and the thrust F' of the second connecting rods 38 is horizontally separated into clamping force $F_β$, then $$F_β = \frac{1}{2} F_3 \tan β.$$

In the description of the invention, it should be understood that the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, and are only for the convenience of describing the invention, rather than indicating or implying that the device or element referred to must have a specific orientation, be configured and operated in a specific orientation, and therefore cannot be understood as a limitation of the invention.

The above-mentioned embodiments only describe the preferred mode of the invention, and do not limit the scope of the invention. Without departing from the design spirit of the invention, all kinds of modifications and improvements made by ordinary technicians in the field to the technical scheme of the invention should fall within the protection scope determined by the claims of the invention.

What is claimed is:

1. A technological equipment for tank track moving supports, comprising:
   a zero-point positioning system;
   a workpiece identifying system; and
   a clamping apparatus, cooperating with a moving support (3), wherein the clamping apparatus comprises: a tooling plate (4); a clamp, detachably connected to the tooling plate (4); and
   a pressing device, detachably connected to the tooling plate (4) and configured for pressing the moving support (3), wherein the moving support (3) is located between the clamp and the pressing device, and the pressing device abuts against the moving support (3).

2. The technological equipment according to claim 1, wherein a surface to be processed of the moving support (3) is uneven, an end face of the moving support (3) is fixedly provided with a convex inclined plane (16) and a concave inclined plane (17);
   wherein the clamp comprises a plurality of first positioning blocks (18), the moving support (3) is positioned above the plurality of first positioning blocks (18), bottoms of the plurality of first positioning blocks (18) are detachably connected with the tooling plate (4), each of the plurality of first positioning blocks (18) is screwed with a first positioning pin (19), and the first positioning pin (19) abuts against the moving support (3);
   and wherein the pressing device comprises a third pressing part (6) and a fourth pressing part (36), the third pressing part (6) and the fourth pressing part (36) are located at two sides of the moving support (3) respectively.

3. The technological equipment according to claim 2, wherein the third pressing part (6) comprises a first cylinder (20) and a first pressing plate (21), an extension rod of the first cylinder (20) is fixedly connected with the first pressing plate (21), and the first pressing plate (21) abuts against the convex inclined plane (16) of the moving support (3).

4. The technological equipment according to claim 2, wherein the fourth pressing part (36) comprises:
   a first base (22), detachably connected with the tooling plate (4);
   a second cylinder (23), fixedly connected with an end of the first base (22);
   a sliding chuck (24), fixedly connected with an extension rod of the second cylinder (23);
   a first connecting rod (25), hinged with the sliding chuck (24);
   a second pressing plate (26), fixedly connected with the first connecting rod (25), wherein the second pressing plate (26) abuts against the concave inclined plane (17).

* * * * *